(12) United States Patent
Kipping et al.

(10) Patent No.: US 8,127,415 B2
(45) Date of Patent: *Mar. 6, 2012

(54) DEVICE FOR MACHINING COMPONENTS, IN PARTICULAR OF A VEHICLE BODY

(75) Inventors: Josef Kipping, Schmelz (DE); Thomas Klemm, Heimbach (DE)

(73) Assignee: ThyssenKrupp Drauz Nothelfer GmbH, Heilbronn (DE)

( * ) Notice: Subject to any disclaimer, the term of this patent is extended or adjusted under 35 U.S.C. 154(b) by 684 days.

This patent is subject to a terminal disclaimer.

(21) Appl. No.: 12/298,865

(22) PCT Filed: Apr. 20, 2007

(86) PCT No.: PCT/EP2007/053881
§ 371 (c)(1),
(2), (4) Date: Dec. 10, 2008

(87) PCT Pub. No.: WO2007/128667
PCT Pub. Date: Nov. 15, 2007

(65) Prior Publication Data
US 2009/0276999 A1    Nov. 12, 2009

(30) Foreign Application Priority Data
May 5, 2006    (DE) .................. 10 2006 020 922

(51) Int. Cl.
*B23P 23/00*    (2006.01)
*B23Q 39/04*    (2006.01)
*B23Q 3/06*    (2006.01)
(52) U.S. Cl. .......... 29/38 R; 29/38 C; 29/33 P; 483/16; 483/15; 228/4.1; 228/6.1; 228/49.1

(58) Field of Classification Search ............. 29/38 R, 29/38 C, 563, 33 P, 33 J; 483/16, 14, 15; 228/212, 4.1, 5.1, 6.1, 49.1; 414/744.5; 901/15
See application file for complete search history.

(56) References Cited

U.S. PATENT DOCUMENTS 5,815,902 A * 10/1998 Osterried et al. ............. 29/38 A
(Continued)

FOREIGN PATENT DOCUMENTS
CA    1307306    9/1992
(Continued)

OTHER PUBLICATIONS

Machine Translation of DE 19914125, which DE '125 was published Sep. 2000.*

(Continued)

*Primary Examiner* — Erica E Cadugan
(74) *Attorney, Agent, or Firm* — Crowell & Moring LLP

(57) ABSTRACT

A device for machining components, in particular of a vehicle body has a transport and positioning unit for the component and several machining stations, which are arranged around said unit and to which the component held by a component holder of the transport and positioning unit can be fed in a position ready for machining. To transport the component from one machining station to the other machining stations while taking up the smallest possible surface area, the transport and positioning unit includes a rotor and a pivoting arm that is mounted eccentrically on said rotor, driven in opposition to the latter and supports the component holder. The drives of the rotor and the pivoting arm are synchronized in such a way that the component holder is displaced along a closed curved path comprising spaces between the neighboring apexes of said path.

4 Claims, 2 Drawing Sheets

U.S. PATENT DOCUMENTS

| | | |
|---|---|---|
| 6,366,830 B2 | 4/2002 | Bacchi et al. |
| 7,744,514 B2 * | 6/2010 | Rossinger .................. 483/1 |
| 2003/0094742 A1 | 5/2003 | Eicher |
| 2005/0224557 A1 | 10/2005 | Kraus |
| 2008/0006675 A1 | 1/2008 | Kraus |
| 2009/0126178 A1 * | 5/2009 | Kipping et al. ............ 29/283 |

FOREIGN PATENT DOCUMENTS

| | | |
|---|---|---|
| DE | 19713860 | 10/1998 |
| DE | 29817895 | 2/2000 |
| DE | 19914125 A1 * | 9/2000 |
| DE | 10153807 | 5/2003 |
| DE | 20211755 | 12/2003 |
| EP | 1060831 A1 * | 12/2000 |
| JP | 62222906 | 9/1987 |
| WO | 8910240 | 11/1989 |

OTHER PUBLICATIONS

International Search Report for PCT/EP2007/053881.

* cited by examiner

DEVICE FOR MACHINING COMPONENTS, IN PARTICULAR OF A VEHICLE BODY

CROSS-REFERENCE TO RELATED APPLICATIONS

This application is a National Phase Application of International Application No. PCT/EP2007/053881, filed on Apr. 20, 2007, which claims the benefit of and priority to German Patent Application No. DE 10 2006 020 922.2-14, filed on May 5, 2006. The disclosure of the above applications are incorporated herein by reference in their entirety.

FIELD OF THE INVENTION

The invention relates to a device for machining components composed of a plurality of individual parts for a vehicle body, having a transport and positioning unit for a component and several machining stations which are disposed around this transport and positioning unit and to which the component, held in a machining position by an exchangeable component holder of the transport and positioning unit can be brought, in that the component holder is guided past the machining stations on a closed circulating path.

BACKGROUND OF THE INVENTION

In the case of a device of the type mentioned in the introduction, which is well-known from practice, the transport and positioning unit is formed as a rotary table with at least one component holder disposed in a stationary manner thereon at its periphery. When the rotary table rotates, the component holder is moved in a circle to the machining stations disposed outside this circle. The changing of a component holder is cumbersome. A changing device must first be used to remove the component holder which is to be changed from the rotary table and to place it outside the device. The new component holder is picked up at a storage point and transported to the rotary table by the changing device. Furthermore, a device of this type requires a large amount of space and can rarely be adapted to pre-existing spaces.

SUMMARY OF THE INVENTION

In general, an aspect of the invention provides a device for machining components composed of a plurality of individual parts for a vehicle body, which, within a space-saving construction, permits the component holders to be changed easily and quickly.

The device includes above a transport and positioning unit a store which holds in readiness the different types of component holders at assigned positions on a circulating path where a component holder carried by the transport and positioning unit can be exchanged for a different type of component holder carried by the store.

The particular allocation of the component holders to specific positions above the transport and positioning unit is space-saving and permits quick and easy exchange of the component holders. The area surrounding the transport and positioning unit is fully and freely available for the placement of other units such as machining robots, ground level transport vehicles, stores etc. The provision of different types of component holders makes it possible to manufacture different components even for different vehicle models in the same manufacturing plant. The manufacturing plant in accordance with the invention is therefore also characterized by a high level of flexibility and short refitting times.

These conditions in one embodiment of the invention are particularly favorable, this embodiment being characterized in that the closed circulating path has at least two apexes, in the region of which the machining stations are located, that between adjacent apexes spaces remain, which are not passed over by the component holder during its movement along the closed circulating path, especially for machining robots to be set up, and that the store holds the component holders in readiness in the region of the apexes. The curved path can be an ellipse or cycloid, in particular a hypocycloid or an astroid. In this embodiment of the invention the assigned points of the curved path at which the component holders are held in readiness by the store are the apexes.

Such curved paths can be produced in terms of transmission technology e.g. in that the transport and positioning unit has a rotor and a pivoting arm which is mounted eccentrically thereon, driven in opposition to the rotor about an axis in parallel with the rotor axis and supports the component holder, wherein the rotational movements of the rotor and pivoting arm are tailored to each other in such a way that the component holder follows the closed curved path with the apexes.

Preferably the component holders held in readiness by the store are held on a common lifting device or supports which can be lowered individually. In this way the component holders can be lowered to a height which makes it easier to exchange them. During the exchange the machining robots, which are to be fitted with corresponding grippers, could also be used.

In order to be able to machine the largest possible number of different types of components a plurality of different types of component holders can be stored on the store in such a way as to be radially displaceable one behind the other. The component holder required at a specific time can then easily be brought to the optimal exchange position.

The supply of power and control commands to the transport and positioning unit is preferably effected from above the transport and positioning unit via a rotary distributor disposed on the rotational axis of the pivoting arm. For the supply lines for power and control commands a line tree can be connected, via the rotary distributor in the manner of a connecting rod, to a source centrally disposed in the axis of the rotor.

DESCRIPTION OF THE DRAWINGS

The invention will be explained in more detail hereinunder with the aid of a drawing schematically illustrating an exemplified embodiment in which.

DESCRIPTION

Figure 1:
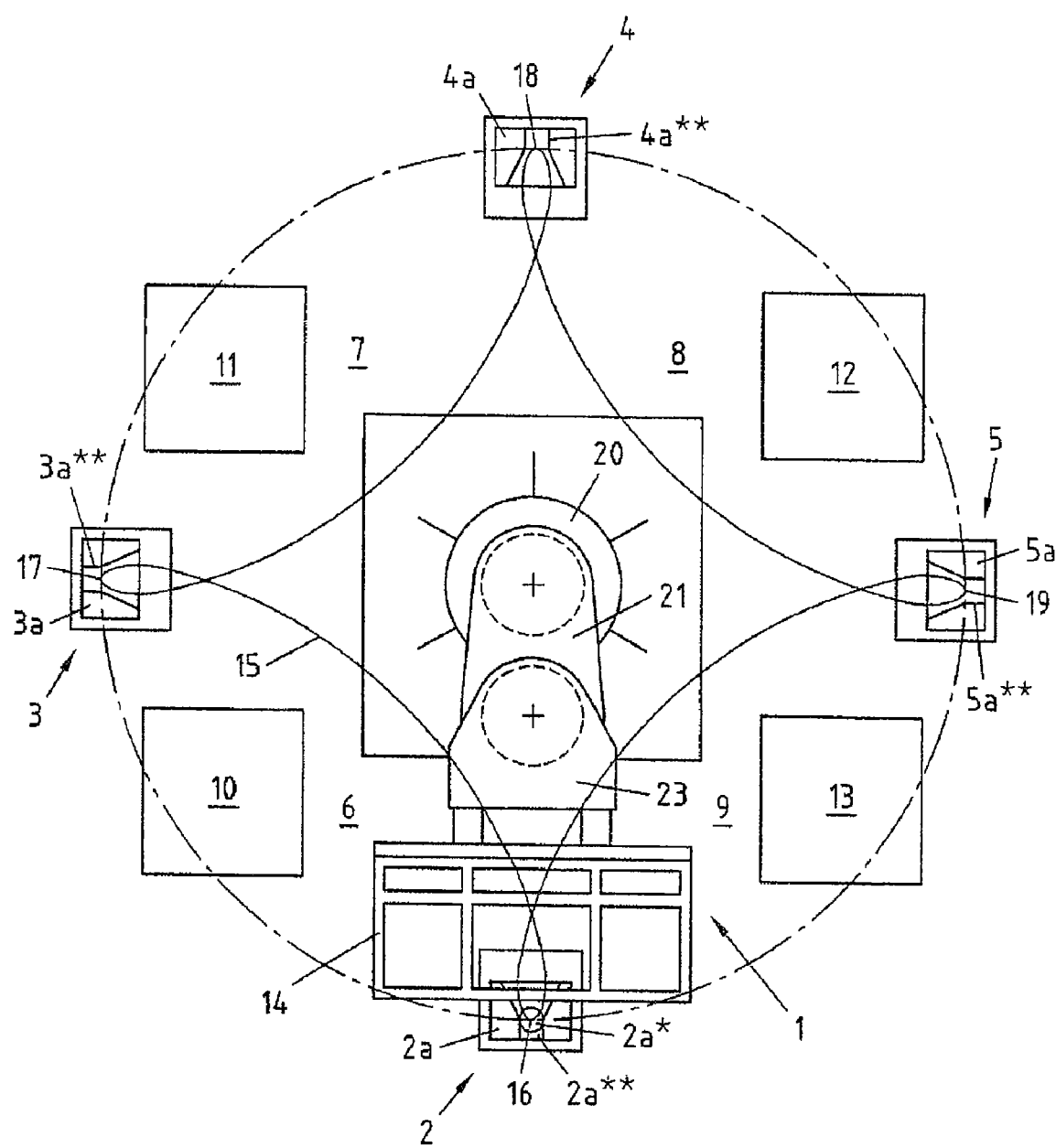
FIG. 1 illustrates a plan view of a device for machining components with a transport and positioning unit and a plurality of machining stations and a plurality of spaces for machining robots.

According to FIG. 1 the device for machining components composed of individual parts for a vehicle body comprises a transport and positioning unit 1 having a plurality of machining stations 2, 3, 4, 5 disposed around this transport and positioning unit 1. Between the machining stations 2, 3, 4, 5 there are spaces 6, 7, 8, 9 which can be used for different purposes, in particular for the placement of machining robots, tool stores, etc. The device can also be placed in such a way that the supporting columns of a factory building are located in the spaces 6, 7, 8, 9. Thus optimal adaptation to the local conditions can be achieved. In the exemplified embodiment of FIG. 1 the spaces 6, 7 are used for the placement of machining robots 10, 11, 12, 13 illustrated only schematically as boxes.

The transport and positioning unit 1 has an exchangeable component holder 14, e.g. a known clamping frame for the component to be machined, not shown. This component holder 14 is moved by the transport and positioning unit 1 on a cycloid curved path 15 with apexes 16, 17, 18, 19 to the machining stations 2, 3, 4, 5. In the apexes 16, 17, 18, 19 the component holder 14, and therefore also the held component, is held in a position suitable for machining by at least one of the neighboring machining robots 10, 11, 12, 13. When the component holder 14 is in the position illustrated in FIG. 1 both the machining robot 10 and also the machining robot 13 can effect machining on the component. The particular curved path 15 imposes the prerequisite that the device with the transport and positioning unit 1 and machining robots 10, 11, 12, 13 is very compact and thus takes up the smallest possible surface area.

Figure 2:
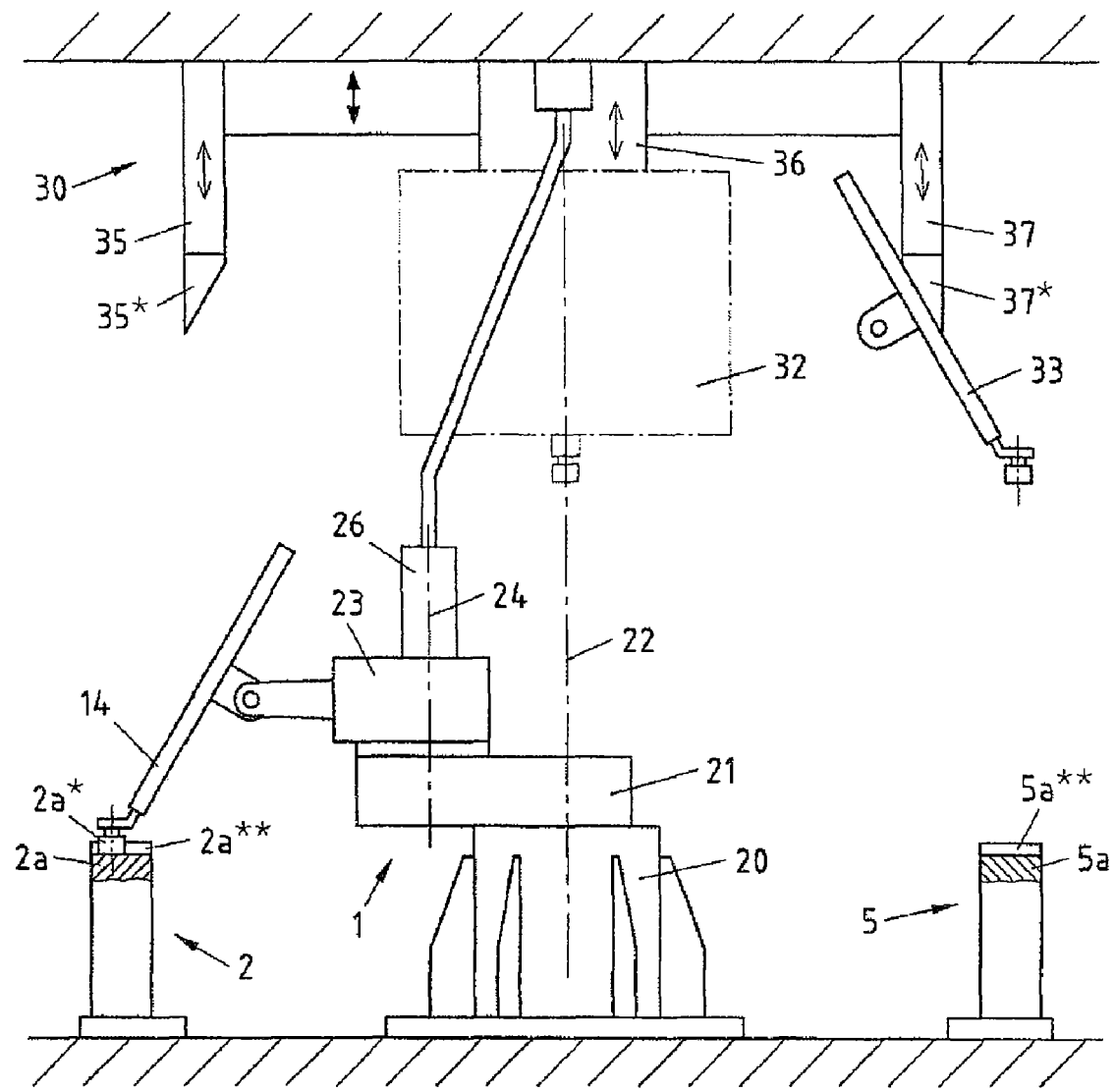
FIG. 2 illustrates a side view of the device in accordance with FIG. 1.

The described cycloid curved path 15 with four apexes 16, 17, 18, 19 in accordance with FIG. 1 or curved paths with a different number of apexes are produced in the case of the exemplified embodiment of the invention with a particular construction and gear mechanism for the transport and positioning unit. As shown in FIG. 2 the transport and positioning unit 1 on a stationary base 20 has a rotor 21 with a rotary drive, not shown in detail. On the rotor 21 a pivoting arm 23 is mounted eccentrically with respect to the rotor axis 22 thereof so as to be able to rotate about an axis 24 in parallel with the rotor axis 22. The pivoting arm 23 is drivingly coupled to the rotor 21 via a wheel gear in such a manner that the rotor 21 and pivoting arm 23 rotate in opposite directions. In this way, e.g. on the base 20, an externally toothed crown is held in a non-rotational manner and is engaged with the intermediate toothed wheel supported by the rotor 21 and mounted so as to be rotatable relative thereto. The intermediate toothed wheel meshes with a driven toothed wheel which is rotatably mounted at the free end of the rotor 21 and is connected in a non-rotatable manner to a drive shaft of the pivoting arm 23. The ratio of the number of teeth on the different toothed wheels and the effective lever arm lengths of the rotor 21 and pivoting arm 23 enable the desired different path curves to be produced. In all cases the relationship: sum of the angles-timing angle=intrinsic rotary angle of the rotor 21 applies for the opposite intrinsic rotations of the rotor 21 and pivoting arm 23, wherein the sum of the angles=360.degree., the timing angle of the angles between the neighboring apexes 16, 17, 18, 19/machining stations=the angle of the intrinsic rotation of the pivoting arm 23 or of the component holder 14 between the neighboring machining stations, and the intrinsic rotary angle of the rotor 21 is the rotary angle of the rotor 21 which the rotor 21 travels in order to move the pivoting arm 23 or the component holder 14 further by a timing angle, i.e. from one machining station to the next.

In an exchangeable manner at its free end the pivoting arm 23 supports the component holder 14, in particular a clamping frame, with which the component to be machined can be held in a precisely preset machining position. In order to support the positioning in this location a respective centering unit 2a, 3a, 4a, 5a can be provided in the machining stations 2, 3, 4, 5 and consists of a vertically mounted support wheel 2a\* on the pivoting arm 23 or component holder 14 and of a stationary connecting link guide **2a\*\*, 3a\*\*, 4a\*\*, 5a\*\*, into which the support wheel 2a\* runs during the substantially radial movement of the component holder 14**.

On the pivoting arm 23 a rotary distributor 26 for supplying power and control commands is disposed in the rotational axis 24 thereof and is connected to a stationary connection point e.g. on the factory ceiling.

On the factory ceiling a star-shaped, in the exemplified embodiment cross-shaped, store 30 with the four apexes 16, 17, 18, 19 for a plurality of different types of component holders 32, 33 with supports 35, 36, 37 is held. The store 30 is either able to be lowered in common with all the supports 35, 36, 37 or the supports 35, 36, 37 can be lowered individually. Each support 35, 36, 37 is fitted with a gripper **35\*, 36\*, 37\* with which a component holder 32, 33** can be held in a fixed manner in a suitable exchange position.

A component holder exchange takes place in the following manner:

In the exemplified embodiment the support 35 is empty. The component holder 14 which is no longer required is already located below the support 35. This is lowered and with its gripper 35\* grasps the component holder 14. Once the latter has been decoupled from the pivoting arm 23 it is raised to its upper parking position by the support 35. In order to fit the pivoting arm 23 with a new component holder e.g. 33 the pivoting arm 23 is brought into the machining station 5 by rotation of the transport and positioning unit I. The support 37 is used to lower the component holder 33 from its upper parking position to its lower exchange position where it is coupled to the pivoting arm 23 and released from the gripper 37\*.

The store 30 can be fitted with even more different types of component holders without any great expense in terms of device technology, in that they are mounted in such a way as to be radially displaceable one behind the other with their supports on the store 30. The required component holder can then be brought by radial displacement into the position suitable for the exchange.

The invention claimed is:

1. Device for machining components composed of a plurality of individual parts for a vehicle body, having a transport and positioning unit for a component and plural machining stations disposed around the transport and positioning unit, wherein the component, held in a machining position by an exchangeable component holder of the transport and positioning unit, can be brought to the plural machining stations, wherein the component holder is guided past the machining stations on a closed curved path, wherein above the transport and positioning unit a store is disposed which holds in readiness different types of component holders at assigned positions on the curved path where a component holder carried by the transport and positioning unit can be exchanged for a different type of component holder carried by the store.

2. Device as claimed in claim 1, wherein the closed curved path has at least two apexes, wherein a respective one of the machining stations is located in the region of each of the apexes, wherein between adjacent apexes spaces remain which are not passed over by the component holder carried by the transport and positioning unit during its movement along the closed curved path, and wherein the store holds the different types of component holders in readiness in the regions of the apexes.

3. Device as claimed in claim 2, wherein the transport and positioning unit has a rotor and a pivoting arm which is mounted eccentrically thereon, driven in opposition to the rotor about an axis in parallel with a rotor axis and which pivoting arm supports the component holder carried by the transport and positioning unit, wherein rotational movements of the rotor and pivoting arm are tailored to each other in such a way that the component holder follows the closed curved path with the apexes.

4. Device as claimed in claim 1, wherein the component holders held in readiness by the store are held by supports which can be lowered individually.

\* \* \* \* \*